(12) United States Patent
Lo

(10) Patent No.: US 10,288,731 B2
(45) Date of Patent: May 14, 2019

(54) DISTANCE DETECTION METHOD AND DISTANCE DETECTION DEVICE USING THE SAME

(71) Applicant: Generalplus Technology Inc., Hsinchu (TW)

(72) Inventor: Li Sheng Lo, Zhubei (TW)

(73) Assignee: GENERALPLUS TECHNOLOGY INC., Hsinchu (TW)

( * ) Notice: Subject to any disclaimer, the term of this patent is extended or adjusted under 35 U.S.C. 154(b) by 255 days.

(21) Appl. No.: 15/441,721

(22) Filed: Feb. 24, 2017

(65) Prior Publication Data

US 2017/0248697 A1   Aug. 31, 2017

(30) Foreign Application Priority Data

Feb. 26, 2016   (TW) .............................. 105105793 A

(51) Int. Cl.
| | | |
|---|---|---|
| *G01S 15/10* | (2006.01) | |
| *G01S 17/10* | (2006.01) | |
| *G01S 7/483* | (2006.01) | |
| *G01S 7/497* | (2006.01) | |
| *G01S 7/52* | (2006.01) | |
| *G01S 7/523* | (2006.01) | |

(52) U.S. Cl.
CPC ............ *G01S 15/104* (2013.01); *G01S 7/483* (2013.01); *G01S 7/497* (2013.01); *G01S 7/523* (2013.01); *G01S 7/52004* (2013.01); *G01S 17/102* (2013.01)

(58) Field of Classification Search
CPC ...... G01S 15/104; G01S 7/483; G01S 17/102; G01S 7/52004; G01S 7/523; G01S 7/497
See application file for complete search history.

(56) References Cited

U.S. PATENT DOCUMENTS

| | | | | |
|---|---|---|---|---|
| 2,453,169 | A * | 11/1948 | Varian ..................... | G01S 13/34 342/122 |
| 3,012,242 | A * | 12/1961 | Machlis ................ | G01S 13/342 342/119 |
| 3,112,481 | A * | 11/1963 | Goldberg .............. | G01S 13/342 342/109 |
| 2007/0211772 | A1* | 9/2007 | Romano ................. | H01S 5/141 372/20 |
| 2017/0248697 | A1* | 8/2017 | Lo .......................... | G01S 15/104 |

FOREIGN PATENT DOCUMENTS

CN            107132544 A  *  9/2017

* cited by examiner

*Primary Examiner* — Daniel Pihulic
(74) *Attorney, Agent, or Firm* — Muncy, Geissler, Olds & Lowe, P.C.

(57) ABSTRACT

Distance detection method and device are provided. The distance detection method comprises: providing a directional signal emitting module; providing a directional signal receiving module having a constant bandwidth; providing a distance detection signal to the directional signal emitting module; changing a frequency of the distance detection signal provided to the directional signal emitting module, and judging whether the directional signal receiving module can decode a reflected directional signal into a received signal; and judging a distance between an external object and the directional signal receiving module according to whether the received signal corresponding to the frequency of the distance detection signal can be decoded.

17 Claims, 11 Drawing Sheets

DISTANCE DETECTION METHOD AND DISTANCE DETECTION DEVICE USING THE SAME

BACKGROUND OF THE INVENTION

This application claims priority of No. 105105793 filed in Taiwan R.O.C. on 2016 Feb. 26 under 35 USC 119, the entire content of which is hereby incorporated by reference.

FIELD OF THE INVENTION

The invention relates to the detection distance technology, and more particularly to distance detection method performed using a bandwidth or frequency band of a directional signal, and a distance detection device using the directional signal.

DESCRIPTION OF THE RELATED ART

FIG. 1 (Prior Art) is a circuit diagram showing an infrared distance detection device. Referring to FIG. 1, the infrared distance detection device comprises a microprocessor 101, an infrared light-emitting diode (LED) 102 and an infrared receiver 103. The microprocessor 101 has a pulse width modulation pin P01 coupled to an anode of the infrared LED 102. The microprocessor 101 outputs a pulse width modulation signal PWMS to the infrared LED 102 through the pulse width modulation pin P01.

FIG. 2 (Prior Art) is a schematic view showing operations of the infrared distance detection device. Referring to FIG. 2, the conventional distance detection method changes a duty cycle of the pulse width modulation signal PWMS provided to the infrared LED 102, and thus changes the energy of the infrared signal emitted from the infrared LED 102, and then judges whether the infrared receiver 103 receives the infrared signal reflected by the object to judge the distance between the object and the infrared distance detection device. For example, when the duty cycle of the pulse width modulation signal PWMS is 50%, the detected distance is D; and when the duty cycle of the pulse width modulation signal PWMS is 25%, the detected distance is (½)D. The microprocessor 101 changes the duty cycle of the pulse width modulation signal PWMS to perform the distance measurement operation.

However, the microprocessor 101 needs the clock signal with the higher frequency in order to generate the pulse width modulation signal. For example, if the pulse width is modulated into 256 orders using the clock signal with the frequency of 38 KHz, then the clock of about 9 MHz is required. An ordinary 8-bit microprocessor does not have such the speed. Furthermore, the ordinary microprocessor has only two to four pulse width modulation input/output pins. If a two-wheel robot has two motors, four pulse width modulation input/output pins have to be used, and there is no width modulation input/output pin for the distance detection. In addition, the infrared input/output pins of the frequently seen microprocessor can output four options (½, ⅓, ¼ and ⅕) of the duty cycle of the pulse width modulation signal. In other words, there is no redundant option for the duty cycle of the infrared input/output pins of the microprocessor. Thus, if the infrared input/output pins of the microprocessor are adopted, the distance detection precision is very low.

SUMMARY OF THE INVENTION

An object of the invention is to provide a distance detection method and a distance detection device using the same by changing a frequency of a directional signal and detecting a reflected directional signal, and by decoding the reflected directional signal into a received signal according to whether the directional signal can be reflected to judge a distance between a to-be-detected object and the distance detection device.

Another object of the invention is to provide a distance detection method and a distance detection device using the same to perform the distance detection without adopting a pulse width modulation method.

In view of this, the invention provides a distance detection method comprising the steps of: providing a directional signal emitting module; providing a directional signal receiving module having a constant bandwidth; providing a distance detection signal to the directional signal emitting module; changing a frequency of the distance detection signal provided to the directional signal emitting module, and judging whether the directional signal receiving module can decode a reflected directional signal into a received signal; and judging a distance between an external object and the directional signal receiving module according to whether the received signal corresponding to the frequency of the distance detection signal can be decoded.

The present invention further provides a distance detection device. The distance detection device includes a directional signal emitting module, a directional signal receiving module and a microprocessor. The directional signal receiving module has a constant bandwidth, a microprocessor includes a first connection port and a second connection port, wherein the first connection port of the microprocessor is coupled to the directional signal emitting module, and the second connection port of the microprocessor is coupled to the directional signal receiving module, wherein the microprocessor provides a distance detection signal to the directional signal emitting module through the first connection port, wherein the microprocessor changes a frequency of the distance detection signal provided to the directional signal emitting module, and judges whether the directional signal receiving module can decode a reflected directional signal into a received signal, and the microprocessor judges a distance between an external object and the directional signal receiving module according to whether the received signal corresponding to the frequency of the distance detection signal can be decoded.

In the distance detection method and the distance detection device according to a preferred embodiment of the present invention, the constant bandwidth ranges from a lower first frequency to a higher second frequency. Further, in a preferred embodiment, the step of changing the frequency of the distance detection signal provided to the directional signal emitting module, and judging whether the directional signal receiving module can decode the reflected directional signal into the received signal includes: selecting the frequency of the distance detection signal from a center frequency of the constant bandwidth to execute: a step (A) of providing the distance detection signal; and a step (B) of decoding the received reflected directional signal; and selecting the frequency of the distance detection signal by adding a frequency variation to the frequency of the distance detection signal, and repeating the steps (A) and (B) until the frequency of the distance detection signal plus the frequency variation is higher than the second frequency.

In the distance detection method and the distance detection device according to a preferred embodiment of the present invention, the constant bandwidth ranges from a lower first frequency to a higher second frequency. Further, in a preferred embodiment, the step of changing the frequency of the distance detection signal provided to the directional signal emitting module, and judging whether the directional signal receiving module can decode the reflected directional signal into the received signal includes: selecting the frequency of the distance detection signal from a center frequency of the constant bandwidth to execute:

a step (A) of providing the distance detection signal; and a step (B) of decoding the received reflected directional signal; selecting the frequency of the distance detection signal by subtracting a frequency variation from the frequency of the distance detection signal, and repeating the steps (A) and (B) until the frequency of the distance detection signal minus the frequency variation is lower than the first frequency.

In the distance detection method and the distance detection device according to a preferred embodiment of the present invention, the constant bandwidth ranges from a lower first frequency to a higher second frequency. Further, in a preferred embodiment, the step of changing the frequency of the distance detection signal provided to the directional signal emitting module, and judging whether the directional signal receiving module can decode the reflected directional signal into the received signal includes: selecting the frequency of the distance detection signal from the first frequency to execute: a step (A) of providing the distance detection signal; and a step (B) of decoding the received reflected directional signal; and selecting the frequency of the distance detection signal by adding a frequency variation to the frequency of the distance detection signal, and repeating the steps (A) and (B) until the frequency of the distance detection signal plus the frequency variation is higher than the second frequency.

In the distance detection method and the distance detection device according to a preferred embodiment of the present invention, the constant bandwidth ranges from a lower first frequency to a higher second frequency. Further, in a preferred embodiment, the step of changing the frequency of the distance detection signal provided to the directional signal emitting module, and judging whether the directional signal receiving module can decode the reflected directional signal into the received signal includes: selecting the frequency of the distance detection signal from the second frequency to execute: a step (A) of providing the distance detection signal; and a step (B) of decoding the received reflected directional signal; and selecting the frequency of the distance detection signal by subtracting a frequency variation from the frequency of the distance detection signal, and repeating the steps (A) and (B) until the frequency of the distance detection signal minus the frequency variation is lower than the first frequency.

In the distance detection method and the distance detection device according to a preferred embodiment of the present invention, the directional signal emitting module is an infrared emitting module, and the directional signal receiving module is an infrared signal receiving module. In a preferred embodiment of the present invention, the directional signal emitting module is an ultrasonic emitting module, and the directional signal receiving module is an ultrasonic signal receiving module.

The essence of the invention is to control the directional signal by changing the frequency of the distance detection signal, and to determine the distance between the to-be-detected object and the distance detection device according to whether the directional signal receiving module successfully decodes the reflected directional signal. Because the pulse width modulation technology needs not to be used, the detection is not restricted by the number of the pulse width modulation pins of the microprocessor. In addition, the invention adopts the frequency regulation technology, which has the lower hardware requirement than the pulse width modulation technology, and can be implemented more easily in the software aspect.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

DETAILED DESCRIPTION OF THE INVENTION

Figure 1:
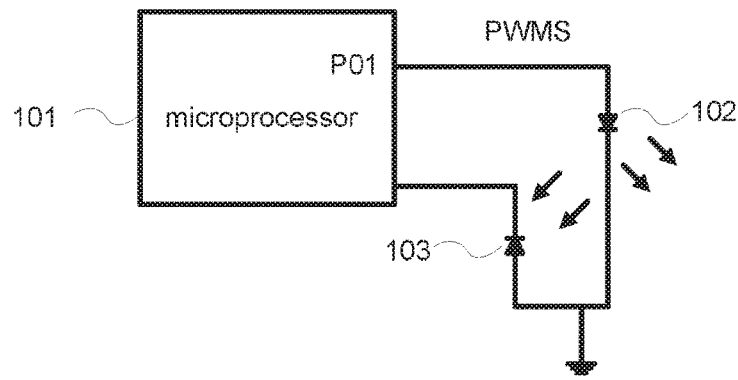
FIG. 1 (Prior Art) is a circuit diagram showing an infrared distance detection device.
Figure 2:
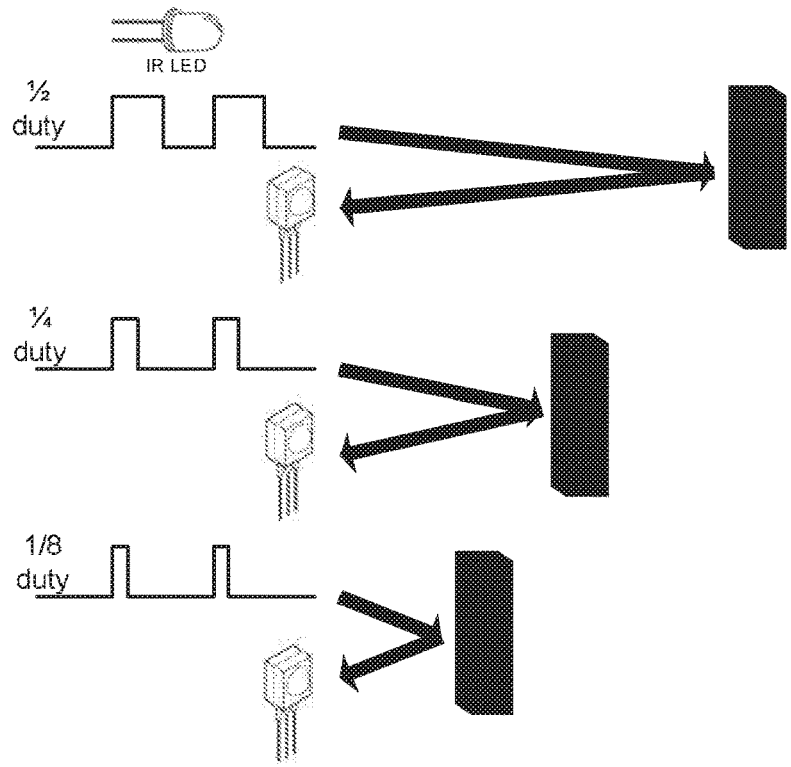
FIG. 2 (Prior Art) is a schematic view showing operations of the infrared distance detection device.
Figure 3:
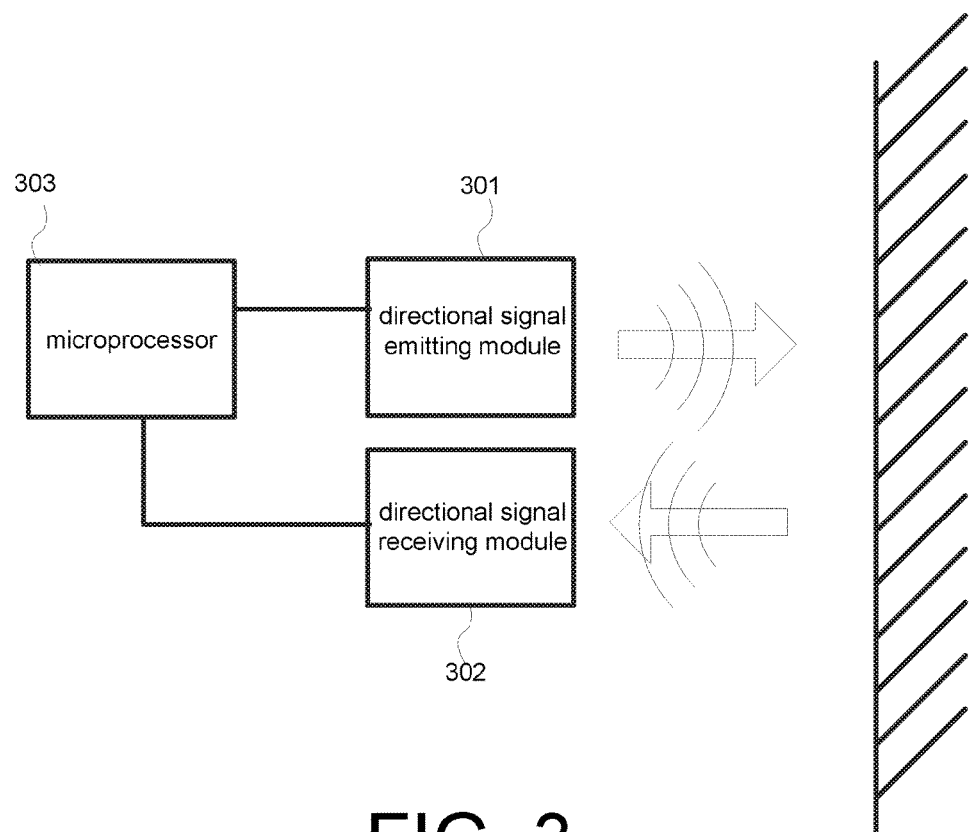
FIG. 3 is a circuit diagram showing a distance detection device according to a preferred embodiment of the invention.
Figure 4:
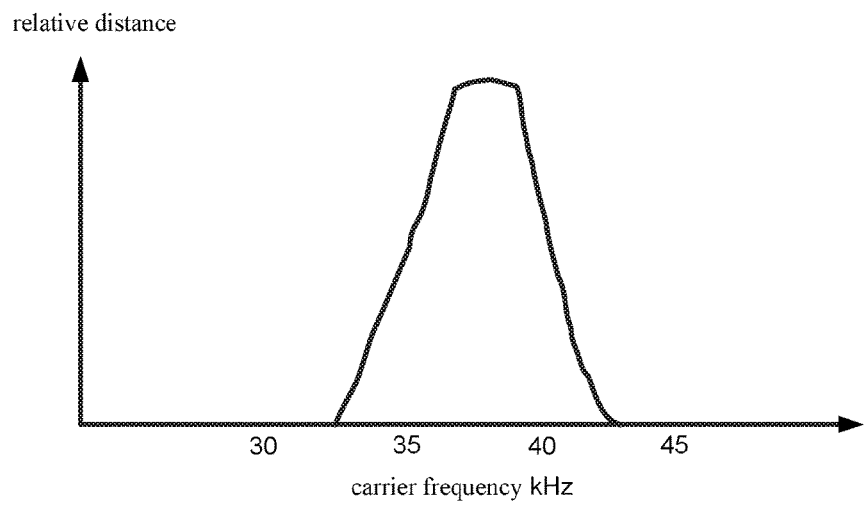
FIG. 4 is a frequency response graph showing a directional signal receiving module 302 of the distance detection device according to a preferred embodiment of the invention.

FIG. 3 is a circuit diagram showing a distance detection device according to a preferred embodiment of the invention. Referring to FIG. 3, the distance detection device comprises a directional signal emitting module 301, a directional signal receiving module 302 and a microprocessor 303. In this embodiment, the directional signal emitting module 301 may be implemented by a specific-frequency-band light emitting module for emitting visible light, infrared light or the like. The directional signal receiving module 302 is a receiving module corresponding to the specific-frequency-band light emitting module. In addition, the directional signal receiving module 302 of this embodiment has a constant bandwidth. FIG. 4 is a frequency response graph showing the directional signal receiving module 302 of the distance detection device according to a preferred embodiment of the invention. Referring to FIG. 4, the horizontal axis represents the frequency, and the vertical axis represents the distance. If the directional signal receiving module 302 is an infrared receiving module, then the vertical axis represents the distance of the received signal which can be decoded from the received infrared signal, and the horizontal axis represents the frequency of the received infrared signal. In this embodiment, the frequency response of the directional signal receiving module 302 is similar to that of a band pass filter.

The microprocessor 303 comprises a first connection port and a second connection port, wherein the first connection port of the microprocessor 303 is coupled to the directional signal emitting module 301, and the second connection port of the microprocessor 303 is coupled to the directional signal receiving module 302. The microprocessor 303 provides a distance detection signal DS to the directional signal emitting module 301 through the first connection port, and the directional signal emitting module 301 emits a directional signal with the same frequency according to the distance detection signal DS. In addition, the directional signal receiving module 302 receives the reflected directional signal at the same time, and decodes the reflected directional signal into a received signal RS transmitted to the microprocessor 303.

In this embodiment, the frequency of the distance detection signal DS outputted from the microprocessor 303 changes with time. Thus, the directional signal emitting module 301 emits directional signals with the same intensity but different frequencies. Referring also to FIG. 4, it is assumed that the directional signal reflected back from the position at 3 meters can be decoded when the emitted directional signal has the center frequency of 38 KHz, and that only the directional signal reflected back from the position at 1.5 meters can be decoded when the emitted directional signal has the frequency of 35 KHz. Because the directional signal receiving module 302 has different successful decoding distances at different frequencies of the directional signal, the microprocessor 303 only needs to change the frequency of the distance detection signal DS, and detect whether the directional signal receiving module 302 successfully decodes to generate the received signal RS to judge the distance.

Figure 5:
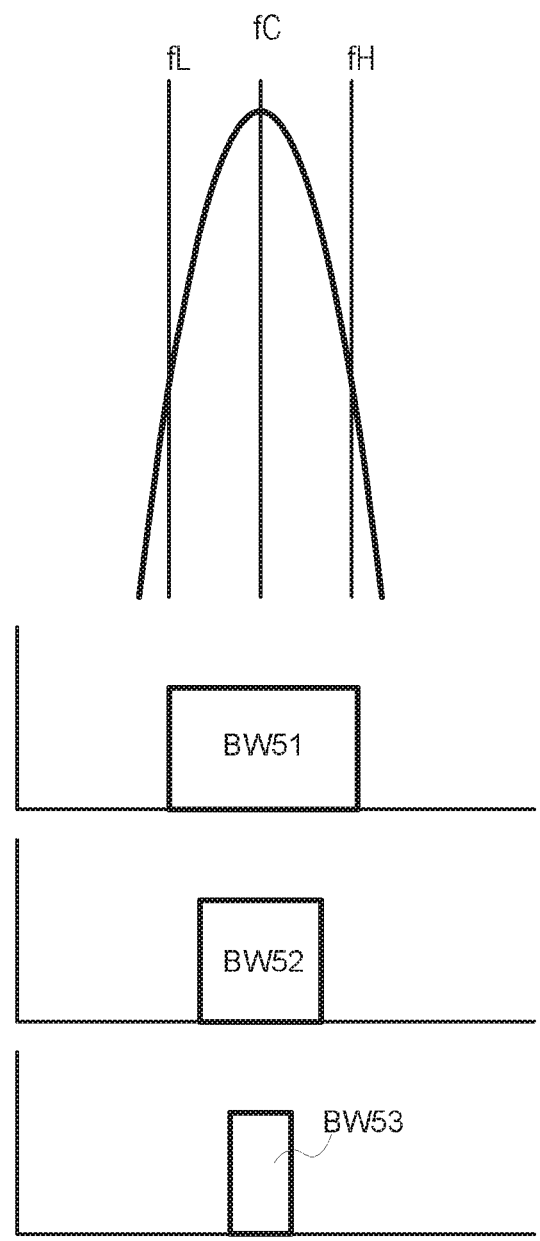
FIG. 5 is a schematic view showing receiving bandwidth and distance of the distance detection device according to a preferred embodiment of the invention.

FIG. 5 is a schematic view showing receiving bandwidth and distance of the distance detection device according to a preferred embodiment of the invention. Referring to FIG. 5, the distance is judged according to the bandwidth in this embodiment. Symbol BW51 represents the bandwidth when the distance between the to-be-detected object and the distance detection device is the short distance. Symbol BW52 represents the bandwidth when the distance between the to-be-detected object and the distance detection device is the middle distance. Symbol BW53 represents the bandwidth when the distance between the to-be-detected object and the distance detection device is the far distance. Symbol FC represents the center frequency. Symbol FL represents the lower-bound frequency. Symbol FH represents the upper-bound frequency. In this embodiment, the microprocessor 303 only needs to simply change the frequency of the distance detection signal DS, from the frequency FL to the frequency FH (or from the frequency FH to the frequency FL), and judge whether the received signal RS is successfully decoded. In other words, the microprocessor 303 performs the simple frequency sweeping operation. The distance between the to-be-detected object and the distance detection device can be determined by detecting the bandwidth.

Because differences between the directional signal receiving modules 302 are frequently present in the manufacturing processes, the center frequencies of the directional signal receiving modules 302 do not fall at 38 KHz. Some directional signal receiving modules 302 may have the center frequency falling at 37.5 KHz; and the other directional signal receiving modules 302 may have the center frequency falling at 39 KHz. However, the frequency sweeping method is adopted in the embodiment. So, even though the center frequency of each directional signal receiving module 302 does not fall at 38 KHz, the differences between the elements need not to be considered as long as the scanning frequency band is wide enough, and the bandwidth is detected to obtain the distance according to the detected bandwidth.

In the above-mentioned embodiment, the frequency is gradually changed from the lower-bound frequency FL to the upper-bound frequency FH or from the upper-bound frequency FH to the lower-bound frequency FL. Those skilled in the art should know that if the element differences between the directional signal receiving modules 302 are not great enough, the above-mentioned embodiment may also adopt the method of gradually changing from the center frequency FC to the upper-bound frequency FH or from the center frequency FC to the lower-bound frequency FL. So, the invention is not restricted thereto.

Figure 6:
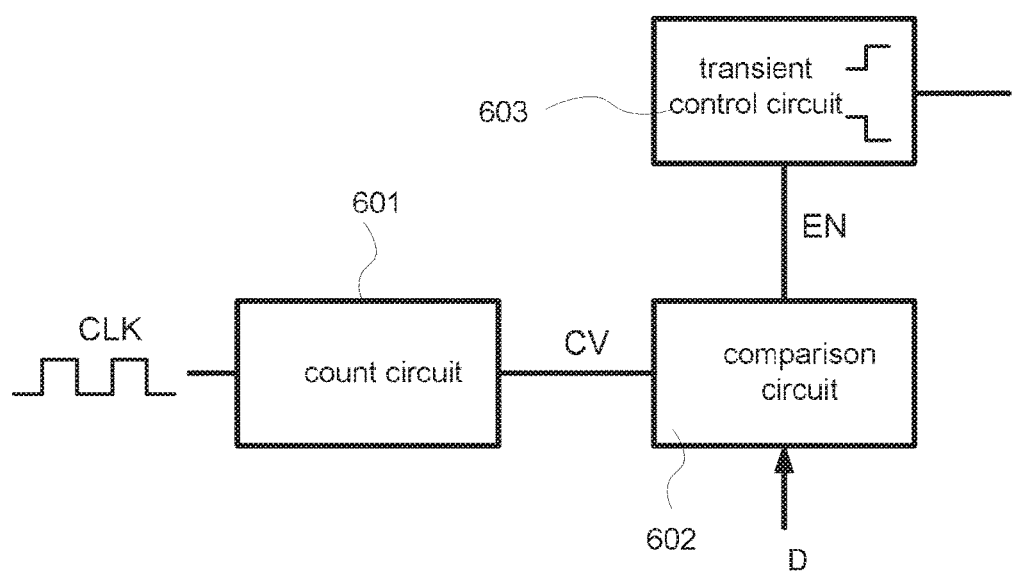
FIG. 6 (Prior Art) is a circuit block diagram showing a duty cycle generating circuit.

In addition, comparing the prior art with the technology of FIG. 3, the technology of FIG. 3 operates by changing the frequency and fixing the duty cycle. For the microprocessor 303, changing the frequency is easier than changing the duty cycle because changing the duty cycle needs the higher clock and changing the duty cycle needs a comparison circuit, as shown in FIG. 6, wherein FIG. 6 (Prior Art) is a circuit block diagram showing a duty cycle generating circuit. Referring to FIG. 6, this duty cycle generating circuit comprises a count circuit 601, a comparison circuit 602 and a transient control circuit 603. The count circuit 601 receives a high-frequency clock signal CLK, and performs calculating according to a positive edge or negative edge of the high-frequency clock signal CLK to output a count value CV. The comparison circuit receives the count value CV and a duty cycle D, and compares the count value CV with a target duty cycle value corresponding to the duty cycle D. When the count value CV is greater than the target duty cycle value, an enabling signal EN is outputted. When the transient control circuit 603 receives the enabling signal EN, the outputted signal is converted from the high voltage to the low voltage, and then the count circuit 601 starts to count from 0, and the comparison circuit 602 starts to compare the count value CV with the target duty cycle value corresponding to (1-D).

However, the operation of changing the frequency is relatively simple because the switching is performed as long as the counter counts to the target value. In addition, for the frequency regulation between 35 KHz to 45 KHz, the required clock is at most 1 MHz, so that the clock required for regulating the pulse width is relatively low.

Figure 7:
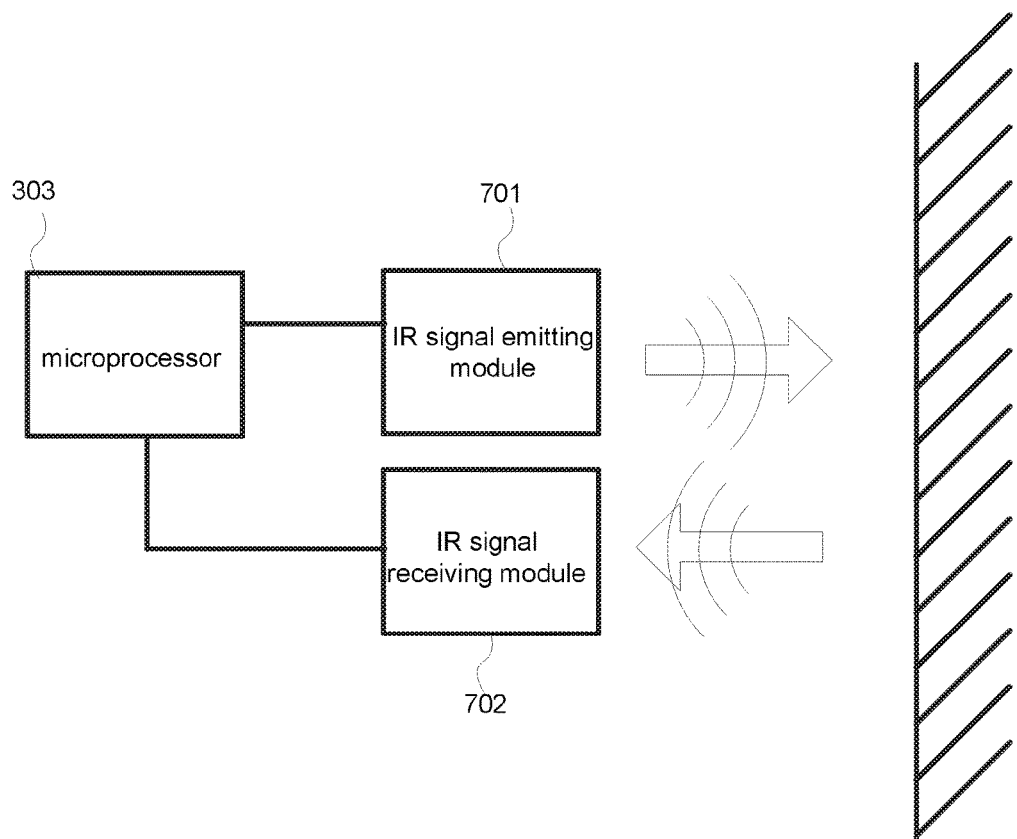
FIG. 7 is a schematic view showing operations of an infrared distance detection device according to a preferred embodiment of the invention.

FIG. 7 is a schematic view showing operations of an infrared distance detection device according to a preferred embodiment of the invention. Referring to FIGS. 7 and 3, the original directional signal emitting module 301 is mainly changed into an infrared signal emitting module 701, and the original directional signal receiving module 302 is mainly changed into an infrared signal receiving module 702 in the infrared distance detection device. The principle thereof is the same as the above-mentioned principle, so detailed descriptions thereof will be omitted.

Figure 8:
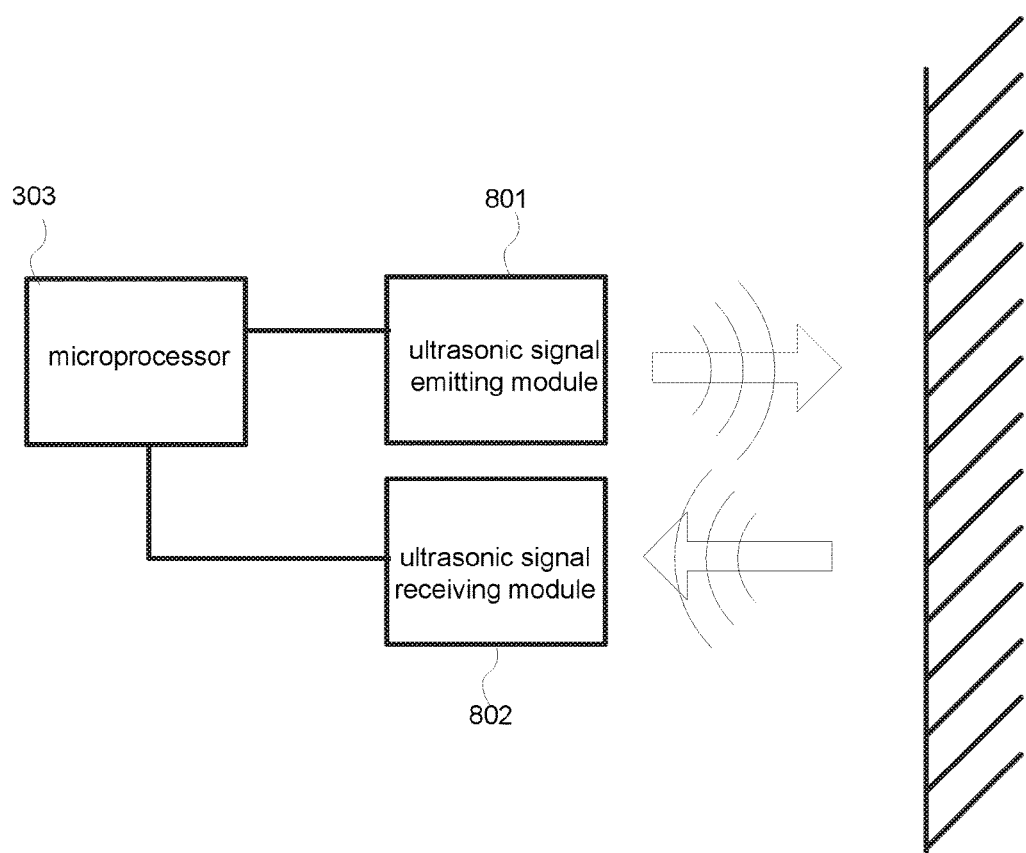
FIG. 8 is a schematic view showing operations of an ultrasonic distance detection device according to a preferred embodiment of the invention.

FIG. 8 is a schematic view showing operations of an ultrasonic distance detection device according to a preferred embodiment of the invention. Referring to FIGS. 8 and 3, the original directional signal emitting module 301 is mainly changed into an ultrasonic signal emitting module 801, and the original directional signal receiving module 302 is mainly changed into an ultrasonic signal receiving module 802 in the ultrasonic distance detection device. The principle thereof is the same as the above-mentioned principle, so detailed descriptions thereof will be omitted.

The directional signals are implemented by the infrared signal and the ultrasonic signal in the above-mentioned two embodiments. Those skilled in the art should know that the visible light or the laser light may also be used in addition to the above-mentioned two signals. Any directional signal may be used and pertains to the scope of the invention. So, the invention is not restricted thereto.

Figure 9:
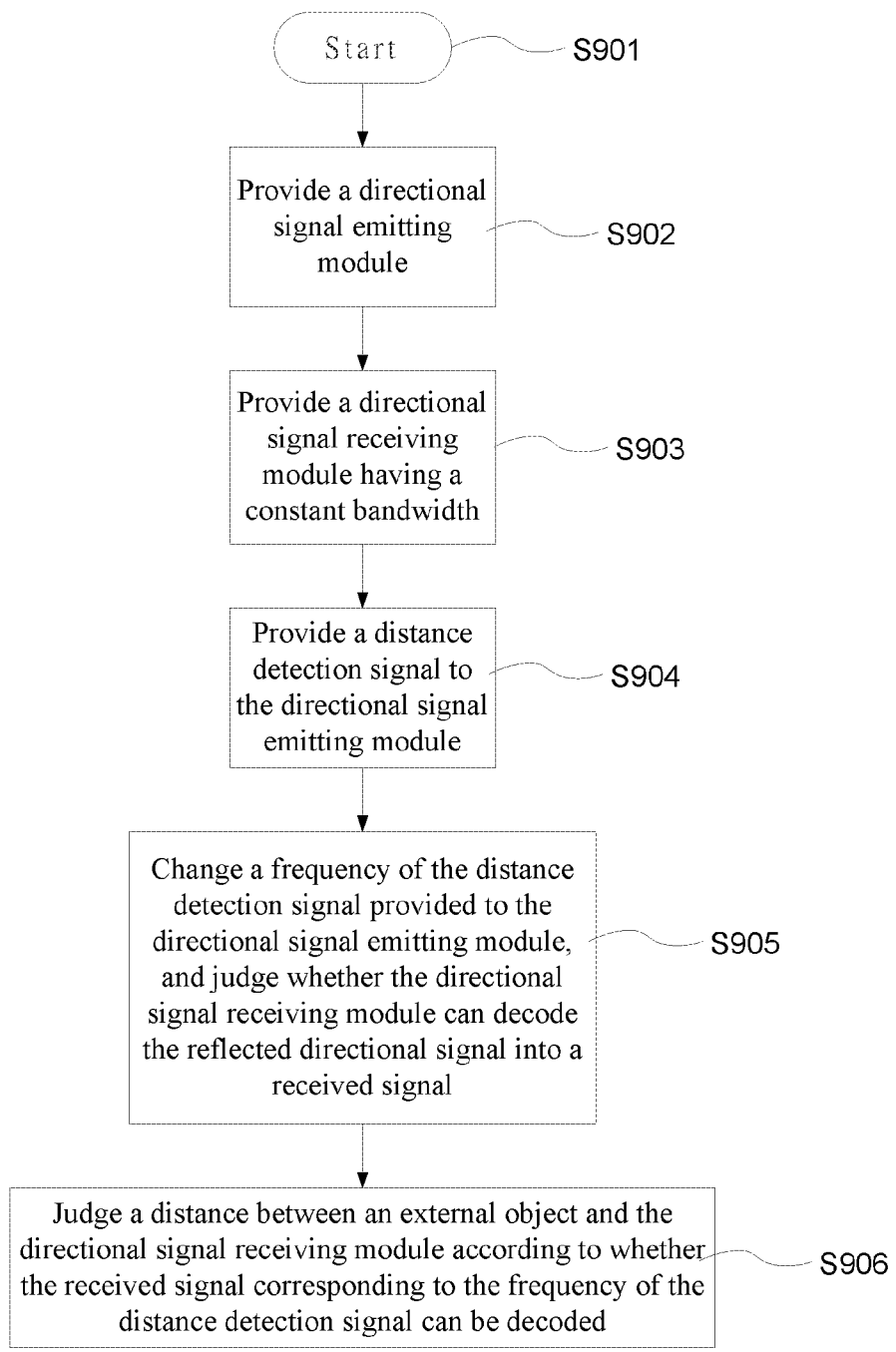
FIG. 9 is a flow chart showing a distance detection method according to a preferred embodiment of the invention.

According to the above-mentioned embodiments, the invention may also be generalized into a distance detection method. FIG. 9 is a flow chart showing a distance detection method according to a preferred embodiment of the invention. Referring to FIG. 9, the distance detection method comprises the following steps.

In step S901, the method starts.

In step S902, a directional signal emitting module, such as an infrared signal emitting module, an ultrasonic signal emitting module or the like, is provided.

In step S903, a directional signal receiving module, such as an infrared signal receiving module, an ultrasonic signal receiving module or the like, having a constant bandwidth is provided.

In step S904, a distance detection signal is provided to the directional signal emitting module.

In step S905, the frequency of the distance detection signal provided to the directional signal emitting module is changed, and it is judged whether the directional signal receiving module can decode the reflected directional signal into a received signal.

In step S906, a distance between an external object and the directional signal receiving module is judged according to whether the received signal corresponding to the frequency of the distance detection signal can be decoded.

Figure 10:
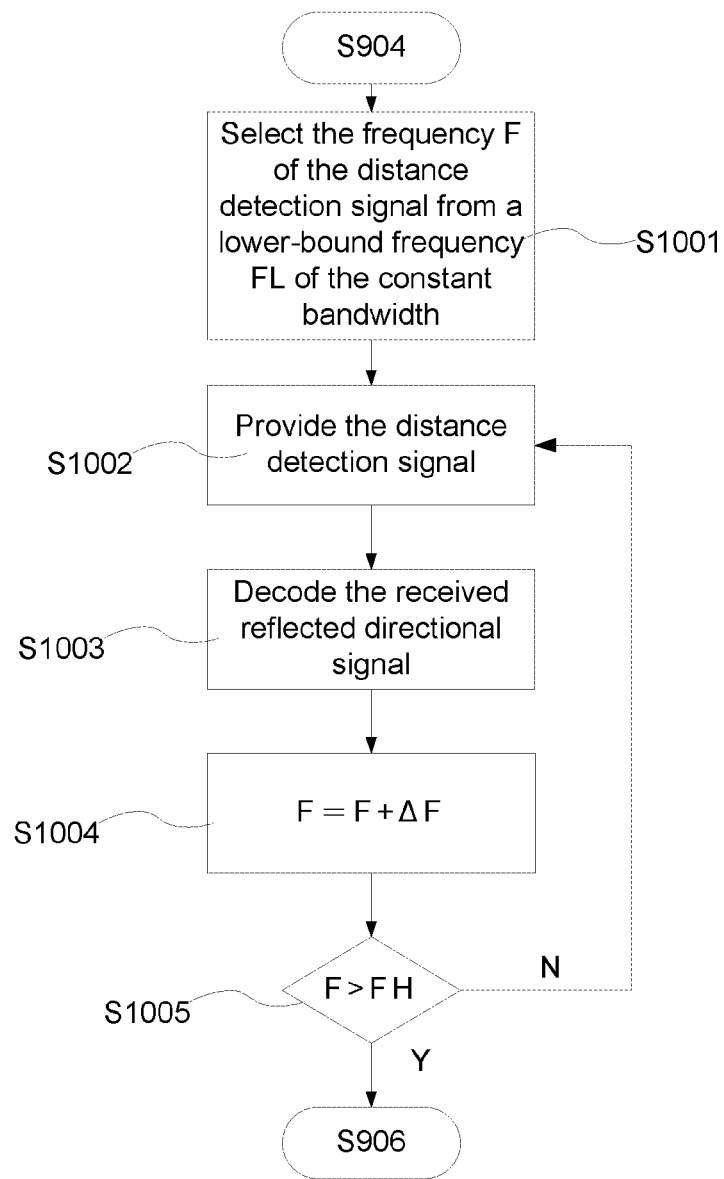
FIG. 10 is a flow chart showing sub-steps of the step S905 of the distance detection method according to a preferred embodiment of the invention.

In addition, the step S905 may be divided into the following sub-steps, as shown in FIG. 10. FIG. 10 is a flow chart showing sub-steps of the step S905 of the distance detection method according to a preferred embodiment of the invention. Referring to FIG. 10, the step S905 comprises the following sub-steps.

In step S1001, the frequency F of the distance detection signal is selected from a lower-bound frequency FL of the constant bandwidth.

In step S1002, the distance detection signal is provided.

In step S1003, the received reflected directional signal is decoded.

In step S1004, the frequency F of the distance detection signal is selected by adding a frequency variation ΔF to the frequency F of the distance detection signal.

In step S1005, it is judged whether the frequency F of the distance detection signal is greater than the upper-bound frequency FH. If the judged result is negative, then the process returns to the step S1002 until the frequency of the distance detection signal plus the frequency variation is greater than the upper-bound frequency FH, and then the step S906 is performed.

Figure 11:
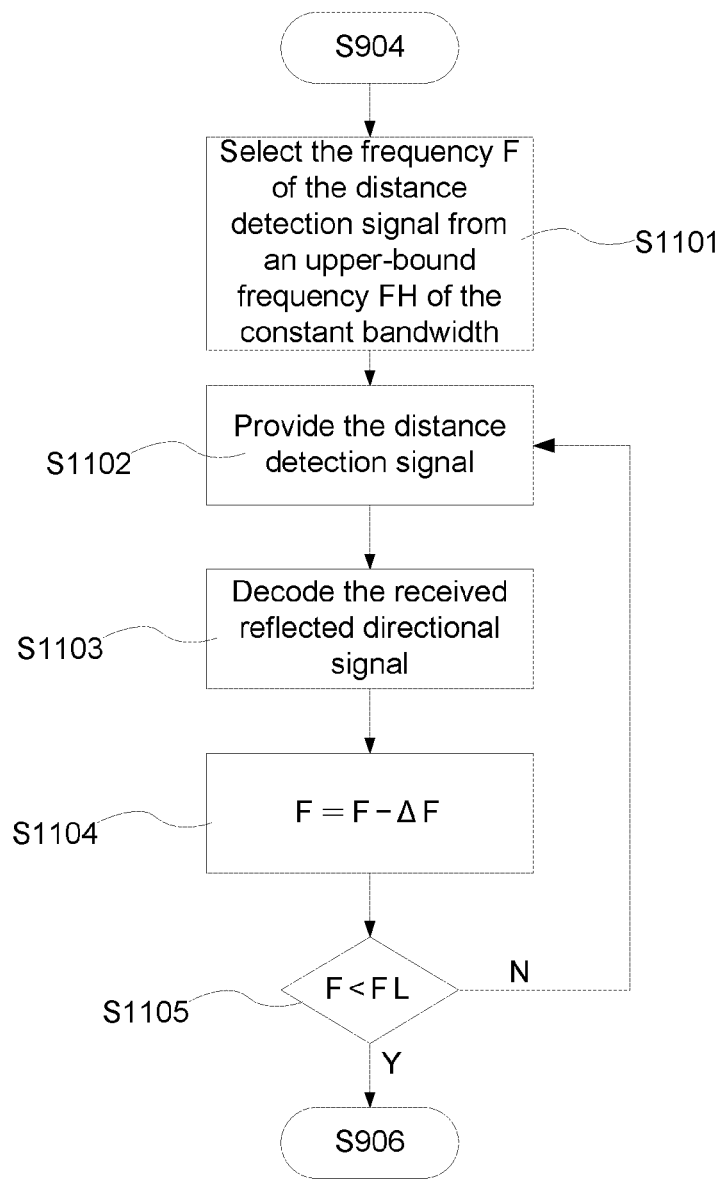
FIG. 11 is a flow chart showing sub-steps of the step S905 of the distance detection method according to a preferred embodiment of the invention.

The above-mentioned frequency sweeping method is adopted in FIG. 10, the frequency is gradually increased from the lower-bound frequency FL to the upper-bound frequency FH. In another embodiment, the step S905 may also be divided into the following sub-steps, as shown in FIG. 11. FIG. 11 is a flow chart showing sub-steps of the step S905 of the distance detection method according to a preferred embodiment of the invention. Referring to FIG. 11, the step S905 comprises the following sub-steps.

In step S1101, the frequency F of the distance detection signal is selected from the upper-bound frequency FH of the constant bandwidth.

In step S1102, the distance detection signal is provided.

In step S1103, the received reflected directional signal is decoded.

In step S1104, the frequency F of the distance detection signal is selected by subtracting a frequency variation ΔF from the frequency F of the distance detection signal.

In step S1105, it is judged whether the frequency F of the distance detection signal is lower than the lower-bound frequency FL. If the judged result is negative, then the process returns to the step S1102 until the frequency of the distance detection signal minus the frequency variation is lower than the lower-bound frequency FL, and then the step S906 is performed.

Figure 12:
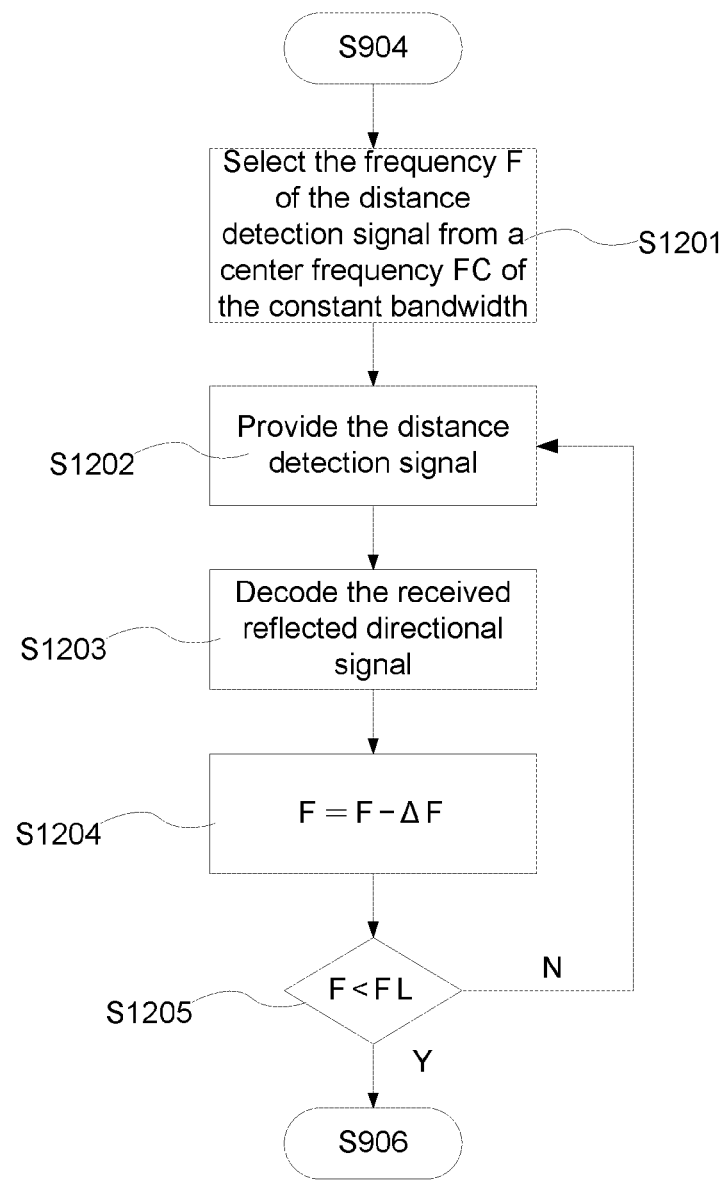
FIG. 12 is a flow chart showing sub-steps of the step S905 of the distance detection method according to a preferred embodiment of the invention.

The above-mentioned frequency sweeping method is similarly adopted in FIG. 11, wherein the frequency is gradually decreased from the upper-bound frequency FH to the lower-bound frequency FL. In another embodiment, the step S905 may also be divided into the following sub-steps, as shown in FIG. 12. FIG. 12 is a flow chart showing sub-steps of the step S905 of the distance detection method according to a preferred embodiment of the invention. Referring to FIG. 12, the step S905 comprises the following sub-steps.

In step S1201, the frequency F of the distance detection signal is selected from the center frequency FC of the constant bandwidth.

In step S1202, the distance detection signal is provided.

In step S1203, the received reflected directional signal is decoded.

In step S1204, the frequency F of the distance detection signal is selected by subtracting a frequency variation ΔF from the frequency of the distance detection signal.

In step S1205, it is judged whether the frequency F of the distance detection signal is lower than the lower-bound frequency FL. If the judged result is negative, then the process returns to the step S1202 until the frequency of the distance detection signal minus the frequency variation is lower than the lower-bound frequency FL, and then the step S906 is performed.

Figure 13:
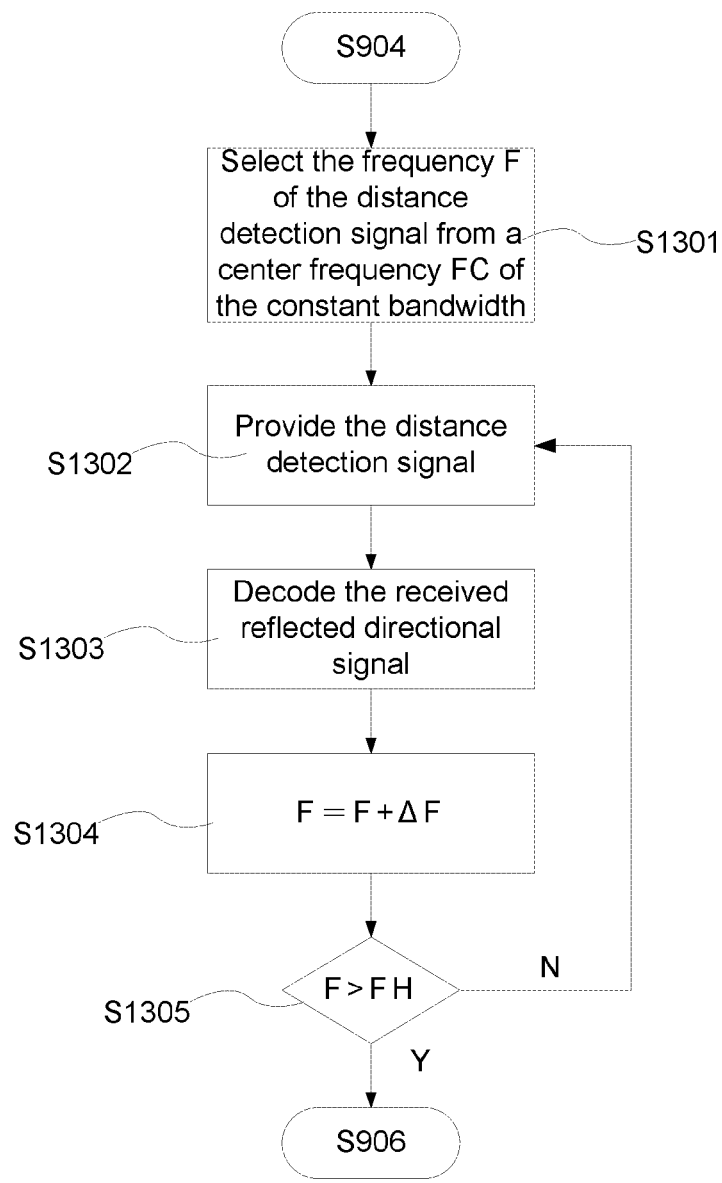
FIG. 13 is a flow chart showing sub-steps of the step S905 of the distance detection method according to a preferred embodiment of the invention.

The above-mentioned frequency sweeping method is similarly adopted in FIG. 12, wherein the frequency is gradually decreased from the center frequency FC to the lower-bound frequency FL. In another embodiment, the step S905 may also be divided into the following sub-steps, as shown in FIG. 13. FIG. 13 is a flow chart showing sub-steps of the step S905 of the distance detection method according to a preferred embodiment of the invention. Referring to FIG. 13, the step S905 comprises the following sub-steps.

In step S1301, the frequency F of the distance detection signal is selected from the center frequency FC of the constant bandwidth.

In step S1302, the distance detection signal is provided.

In step S1303, the received reflected directional signal is decoded.

In step S1304, the frequency F of the distance detection signal is selected by adding a frequency variation ΔF to the frequency of the distance detection signal.

In step S1305, it is judged whether the frequency F of the distance detection signal is higher than the upper-bound frequency FH. If the judged result is negative, then the processes returns to the step S1302 until the frequency of the distance detection signal plus the frequency variation is greater than the upper-bound frequency FH, and then the step S906 is performed.

Although the above-mentioned embodiments provide four frequency sweeping methods, those skilled in the art should know that it is not necessarily that the initial value of the frequency F of the distance detection signal is the lower-bound frequency FL, the upper-bound frequency FH or the center frequency FC. In addition, it is not necessarily that the ending value of the frequency F of the distance detection signal is the lower-bound frequency FL, the upper-bound frequency FH or the center frequency FC. The invention is not restricted thereto.

In summary, the essence of the invention is to control the directional signal by changing the frequency of the distance detection signal, and to determine the distance between the to-be-detected object and the distance detection device according to whether the directional signal receiving module successfully decodes the reflected directional signal. Because the pulse width modulation technology needs not to be used, the detection is not restricted by the number of the pulse width modulation pins of the microprocessor. In addition, the invention adopts the frequency regulation technology, which has the lower hardware requirement than the pulse width modulation technology, and can be implemented more easily in the software aspect.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A distance detection method, comprising the steps of:
providing a directional signal emitting module;
providing a directional signal receiving module having a constant bandwidth;
providing a distance detection signal to the directional signal emitting module;
changing a frequency of the distance detection signal provided to the directional signal emitting module, and judging whether the directional signal receiving module can decode a reflected directional signal into a received signal; and
judging a distance between an external object and the directional signal receiving module according to whether the received signal corresponding to the frequency of the distance detection signal can be decoded.

2. The distance detection method according to claim 1, wherein the constant bandwidth ranges from a lower first frequency to a higher second frequency.

3. The distance detection method according to claim 2, wherein the step of changing the frequency of the distance detection signal provided to the directional signal emitting module, and judging whether the directional signal receiving module can decode the reflected directional signal into the received signal comprises:
selecting the frequency of the distance detection signal from a center frequency of the constant bandwidth to execute:
a step (A) of providing the distance detection signal; and
a step (B) of decoding the received reflected directional signal; and
selecting the frequency of the distance detection signal by adding a frequency variation to the frequency of the distance detection signal, and repeating the steps (A) and (B) until the frequency of the distance detection signal plus the frequency variation is higher than the second frequency.

4. The distance detection method according to claim 2, wherein the step of changing the frequency of the distance detection signal provided to the directional signal emitting module, and judging whether the directional signal receiving module can decode the reflected directional signal into the received signal comprises:
selecting the frequency of the distance detection signal from a center frequency of the constant bandwidth to execute:
a step (A) of providing the distance detection signal; and
a step (B) of decoding the received reflected directional signal;
selecting the frequency of the distance detection signal by subtracting a frequency variation from the frequency of the distance detection signal, and repeating the steps (A) and (B) until the frequency of the distance detection signal minus the frequency variation is lower than the first frequency.

5. The distance detection method according to claim 2, wherein the step of changing the frequency of the distance detection signal provided to the directional signal emitting module, and judging whether the directional signal receiving module can decode the reflected directional signal into the received signal comprises:
selecting the frequency of the distance detection signal from the first frequency to execute:
a step (A) of providing the distance detection signal; and
a step (B) of decoding the received reflected directional signal; and
selecting the frequency of the distance detection signal by adding a frequency variation to the frequency of the distance detection signal, and repeating the steps (A) and (B) until the frequency of the distance detection signal plus the frequency variation is higher than the second frequency.

6. The distance detection method according to claim 2, wherein the step of changing the frequency of the distance detection signal provided to the directional signal emitting module, and judging whether the directional signal receiving module can decode the reflected directional signal into the received signal comprises:
selecting the frequency of the distance detection signal from the second frequency to execute:
a step (A) of providing the distance detection signal; and
a step (B) of decoding the received reflected directional signal; and
selecting the frequency of the distance detection signal by subtracting a frequency variation from the frequency of the distance detection signal, and repeating the steps (A) and (B) until the frequency of the distance detection signal minus the frequency variation is lower than the first frequency.

7. The distance detection method according to claim 1, wherein the directional signal emitting module is an infrared emitting module, and the directional signal receiving module is an infrared signal receiving module.

8. The distance detection method according to claim 1, wherein the directional signal emitting module is an ultrasonic emitting module, and the directional signal receiving module is an ultrasonic signal receiving module.

9. A distance detection device, comprising:
a directional signal emitting module;
a directional signal receiving module having a constant bandwidth; and
a microprocessor comprising a first connection port and a second connection port, wherein the first connection port of the microprocessor is coupled to the directional signal emitting module, and the second connection port of the microprocessor is coupled to the directional signal receiving module, wherein the microprocessor provides a distance detection signal to the directional signal emitting module through the first connection port;
wherein the microprocessor changes a frequency of the distance detection signal provided to the directional signal emitting module, and judges whether the directional signal receiving module can decode a reflected directional signal into a received signal, and
the microprocessor judges a distance between an external object and the directional signal receiving module according to whether the received signal corresponding to the frequency of the distance detection signal can be decoded.

10. The distance detection device according to claim 9, wherein the directional signal receiving module comprises:
an infrared sensor comprising a first end and a second end, wherein the first end of the infrared sensor is coupled to a common voltage; and
a band pass filter comprising an input terminal and an output terminal, wherein the input terminal of the band pass filter is coupled to the second end of the infrared sensor, and the output terminal of the band pass filter is coupled to the second connection port of the microprocessor,
wherein a bandwidth of the band pass filter is the constant bandwidth, wherein the constant bandwidth ranges from a lower first frequency to a higher second frequency.

11. The distance detection device according to claim 10, wherein the directional signal receiving module further comprises:
a pre-amplifying circuit comprising an input terminal and an output terminal, wherein the input terminal of the pre-amplifying circuit is coupled to the second end of the infrared sensor, and the output terminal of the pre-amplifying circuit is coupled to the input terminal of the band pass filter;
a demodulation circuit comprising an input terminal and an output terminal, wherein the input terminal of the demodulation circuit is coupled to the output terminal of the band pass filter is; and
an output stage circuit comprising an input terminal and an output terminal, wherein the input terminal of the output stage circuit is coupled to the output terminal of the demodulation circuit.

12. The distance detection device according to claim 10, wherein the microprocessor executes the following operations:
selecting the frequency of the distance detection signal from a center frequency of the constant bandwidth to execute:
an operation (A), in which the microprocessor transmits the distance detection signal to the directional signal emitting module; and
an operation (B), in which the directional signal receiving module decodes the received reflected directional signal; and
selecting the frequency of the distance detection signal by adding a frequency variation to the frequency of the distance detection signal, and repeating the operations (A) and (B) until the frequency of the distance detection signal plus the frequency variation is higher than the second frequency.

13. The distance detection device according to claim 10, wherein the microprocessor executes the following operations:
selecting the frequency of the distance detection signal from a center frequency of the constant bandwidth to execute:
an operation (A), in which the microprocessor transmits the distance detection signal to the directional signal emitting module; and
an operation (B), in which the directional signal receiving module decodes the received reflected directional signal; and
selecting the frequency of the distance detection signal by subtracting a frequency variation from the frequency of the distance detection signal, and repeating the operations (A) and (B) until the frequency of the distance detection signal minus the frequency variation is lower than the first frequency.

14. The distance detection device according to claim 10, wherein the microprocessor executes the following operations:
selecting the frequency of the distance detection signal from the first frequency to execute:
an operation (A), in which the microprocessor transmits the distance detection signal to the directional signal emitting module; and
an operation (B), in which the directional signal receiving module decodes the received reflected directional signal; and
selecting the frequency of the distance detection signal by adding a frequency variation to the frequency of the distance detection signal, and repeating the operations (A) and (B) until the frequency of the distance detection signal plus the frequency variation is higher than the second frequency.

15. The distance detection device according to claim 10, wherein the microprocessor executes the following operations:
selecting the frequency of the distance detection signal from the second frequency to execute:
an operation (A), in which the microprocessor transmits the distance detection signal to the directional signal emitting module; and
an operation (B), in which the directional signal receiving module decodes the received reflected directional signal; and
selecting the frequency of the distance detection signal by subtracting a frequency variation from the frequency of the distance detection signal, and repeating the steps (A) and (B) until the frequency of the distance detection signal minus the frequency variation is lower than the first frequency.

16. The distance detection device according to claim 9, wherein the directional signal emitting module is an infrared emitting module, and the directional signal receiving module is an infrared signal receiving module.

17. The distance detection device according to claim 9, wherein the directional signal emitting module is an ultrasonic emitting module, and the directional signal receiving module is an ultrasonic signal receiving module.

* * * * *